(12) United States Patent
Nishikawa

(10) Patent No.: US 9,218,554 B2
(45) Date of Patent: Dec. 22, 2015

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Naoyuki Nishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/334,058

(22) Filed: Jul. 17, 2014

(65) Prior Publication Data

US 2014/0327923 A1 Nov. 6, 2014

Related U.S. Application Data

(63) Continuation of application No. 13/406,222, filed on Feb. 27, 2012, now Pat. No. 8,804,145.

(30) Foreign Application Priority Data

Mar. 7, 2011 (JP) .................. 2011-048654

(51) Int. Cl.
*G06K 15/02* (2006.01)
*G06T 11/40* (2006.01)
*G06F 3/12* (2006.01)
*G06F 15/80* (2006.01)

(52) U.S. Cl.
CPC .......... *G06K 15/1894* (2013.01); *G06F 3/1298* (2013.01); *G06K 15/1822* (2013.01); *G06K 15/1847* (2013.01); *G06K 15/1849* (2013.01); *G06K 15/1857* (2013.01); *G06T 11/40* (2013.01)

(58) Field of Classification Search
CPC ..................................................... G06F 3/1298
See application file for complete search history.

(56) References Cited

U.S. PATENT DOCUMENTS

| | | | | | |
|---|---|---|---|---|---|
| 4,967,392 | A | * | 10/1990 | Werner et al. ................. | 345/505 |
| 5,008,838 | A | * | 4/1991 | Kelleher et al. ............... | 345/422 |
| 6,529,289 | B1 | * | 3/2003 | Konno et al. .................. | 358/1.17 |
| 7,925,473 | B2 | * | 4/2011 | DeWitt et al. ................. | 702/186 |
| 2005/0149936 | A1 | * | 7/2005 | Pilkington .................... | 718/102 |
| 2005/0149937 | A1 | * | 7/2005 | Pilkington .................... | 718/102 |
| 2006/0285682 | A1 | * | 12/2006 | Sarangarajan et al. ......... | 380/28 |
| 2008/0001953 | A1 | * | 1/2008 | Nagao et al. .................. | 345/502 |
| 2008/0215817 | A1 | * | 9/2008 | Nonogaki et al. ............. | 711/130 |
| 2010/0302564 | A1 | * | 12/2010 | Ozawa .......................... | 358/1.9 |
| 2011/0235105 | A1 | * | 9/2011 | Ozawa et al. ................. | 358/1.15 |

FOREIGN PATENT DOCUMENTS

JP 2009-241485 A 10/2009
JP 2011-034139 A 2/2011

* cited by examiner

*Primary Examiner* — Beniyam Menberu
(74) *Attorney, Agent, or Firm* — Canon USA., Inc. IP Division

(57) ABSTRACT

A method for image processing executed by an image processing apparatus includes sequentially receiving PDL data and transferring a figure included in the PDL data to processing in a subsequent stage, assigning edge extraction processing as a unit of processing for extracting edge information for each transferred figure, merging the edge information extracted from each figure, spooling the merged data in a tile format as intermediate data, and reading out the intermediate data in the tile format from spooling process and performing processing on each tile to generate a pixel from the intermediate data.

18 Claims, 16 Drawing Sheets

IMAGE PROCESSING APPARATUS, IMAGE PROCESSING METHOD, AND STORAGE MEDIUM

CROSS-REFERENCE TO RELATED APPLICATION

This application is a Continuation of U.S. application Ser. No. 13/406,222 filed Feb. 27, 2012, which claims the benefit of Japanese Patent Application No. 2011-048654 filed Dec. Mar. 7, 2011, which is hereby incorporated by reference herein in its entirety.

BACKGROUND OF THE INVENTION

1. Field of the Invention

The present invention relates to an image processing apparatus, an image processing method, and a storage medium.

2. Description of the Related Art

Conventionally, a rendering method that extracts outline information (also referred to as edge information) from coordinates information of a figure and forms an image based on the outline information is widely used in order to draw a figure. Such a method is discussed in Japanese Patent Application Laid-Open No. 4-170686. The outline information is expressed by straight lines. A digital differential analyzer (DDA) algorithm is a known graphics algorithm used for rasterization of lines (see David Rogers, "Procedural Elements for Computer Graphics" McGraw-Hill Education).

FIG. 1 illustrates an example of conventional renderer processing. In FIG. 1, an input figure is divided into bands before it is processed. A typical problem in graphics processing that occurs in such system is the reduction of the rendering speed when many graphic objects are input. Japanese Patent Application Laid-Open No. 2003-51019 discusses a method for increasing the processing speed by dividing input figures into bands as illustrated in FIG. 1 and assigning an independent processing unit (thread) to each band.

According to a conventional renderer, edge data of a scan line is generated at the time when coordinates information or line segment information such as a path of the figure is transferred to the renderer. Thus, each figure cannot be independently processed. On the other hand, if a figure is divided into band units, parallel processing can be performed since each region is independent. According to this method, the execution of parallel processing can be efficiently performed under certain conditions. However, not all cases can be efficiently processed.

For example, if one figure exists in two adjacent band regions A and B arranged one above the other, parallel processing cannot be executed in that state. In order to perform processing in such a state, it is necessary to supply the figure (replicate data of the figure and transfer the obtained data) to each of the two band regions. Thus, sufficient high speed processing cannot be expected if Page Description Language (PDL) data including a number of figures at the band boundary regions is processed by band parallel processing. Although it is possible to adjust the break position of the bands considering the arrangement of the objects, since there will be figures on the border of regions regardless of the adjustment, it will not fundamentally solve the problem Further, if only one thread can be assigned to one band as a basic unit of processing, and if the distribution of objects is extremely unbalanced (e.g. several hundreds of objects in one band), high speed processing cannot be expected.

SUMMARY OF THE INVENTION

The present invention relates to realizing high-speed rendering processing.

According to an aspect of the present invention, an image processing apparatus includes a receiving unit configured to sequentially receive page description language (PDL) data and transfer a figure included in the PDL data to processing in a subsequent stage, an assigning unit configured to assign edge extraction processing as a unit of processing for extracting edge information for each figure transferred from the receiving unit, a merging unit configured to merge the edge information extracted for each figure, a spool unit configured to spool the data merged by the merging unit in a tile format as intermediate data, and a generation unit configured to read out the intermediate data in the tile format from the spool unit and perform processing on each tile to generate a pixel from the intermediate data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 2:
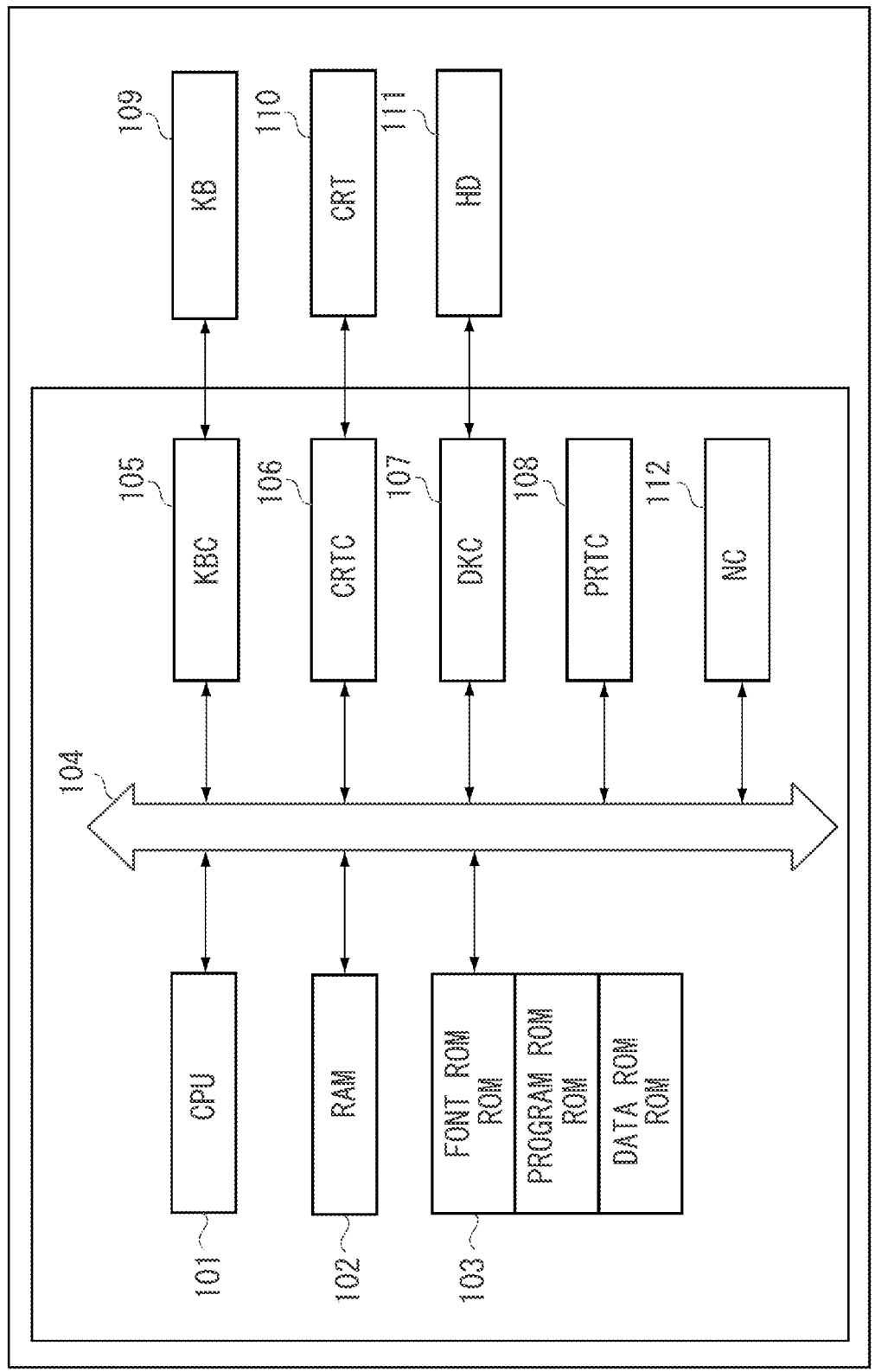
FIG. 2 illustrates an example of a hardware configuration of an image processing apparatus.

FIG. 2 illustrates an example of a hardware configuration of an image processing apparatus according to a first exemplary embodiment of the present invention. In FIG. 2, a central processing unit (CPU) 101 executes an operating system (OS) and a program of general application loaded from a read-only memory (ROM) 103 or a hard disk 111 to a random access memory (RAM) 102, and realizes the functions of the software and the processing of the flowchart described below.

The RAM 102 functions as a main memory and a work area of the CPU 101. A keyboard controller (KBC) 105 controls key input from a keyboard 109 or a pointing device (not illustrated). A cathode ray tube controller (CRTC) 106 controls a display of a CRT display 110.

A disk controller (DKC) 107 controls access to a hard disk (HD) 111 or a flexible disk (FD) that stores a boot program, various application programs, font data, and user files. A printer controller (PRTC) 108 controls exchange of signals between the image processing apparatus and a connected printer (not illustrated). A network controller (NC) 112 is connected to a network and executes control processing regarding communication with other apparatuses connected to the network.

According to the present exemplary embodiment, functions of the image processing apparatus, which are described below, are realized by software. However, each function can be realized by a dedicated hardware device installed in the image processing apparatus.

Although the CPU 101 according to the present exemplary embodiment is a multi-core CPU, the image processing apparatus can include a plurality of CPUs.

Figure 3:
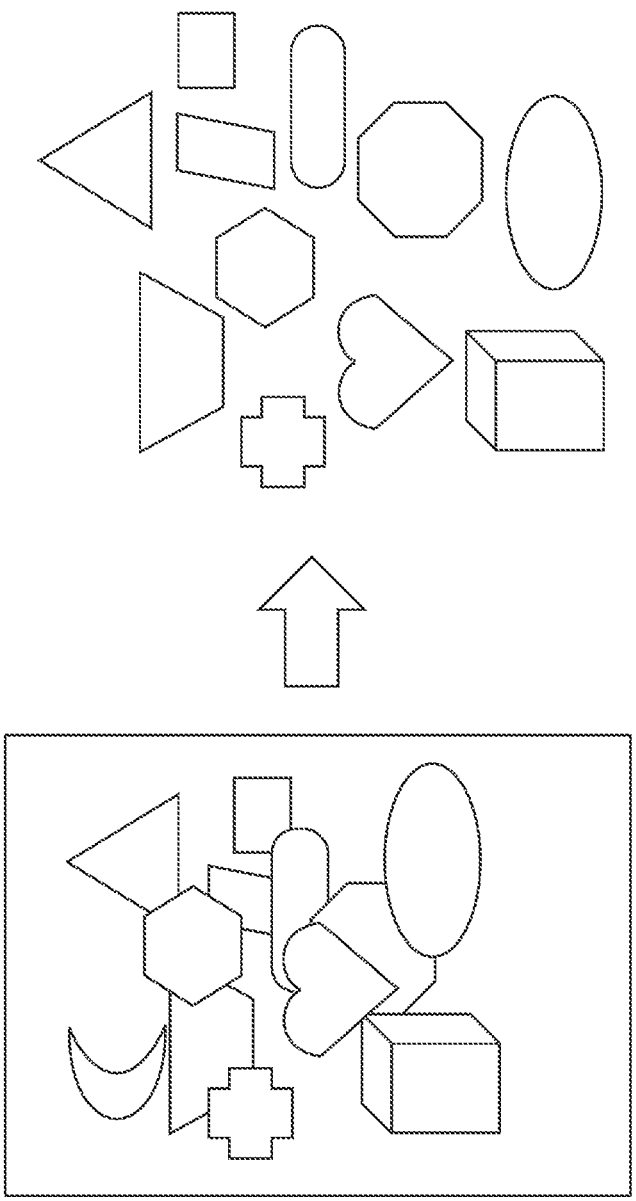
FIG. 3 illustrates an example of assignment of a processing unit (thread) for each figure.

The renderer according to the present exemplary embodiment assigns a unit of processing (thread) for each figure as illustrated in FIG. 3. Although the figures are arranged at positions (absolute coordinates) on a page, each of the figures can be mapped to individual relative coordinates. In other words, the absolute coordinates are converted into relative coordinates having the upper left corner of a circumscribed rectangle of the figure as the point of origin. Then, edge extraction processing of each region can be performed.

Figure 4:
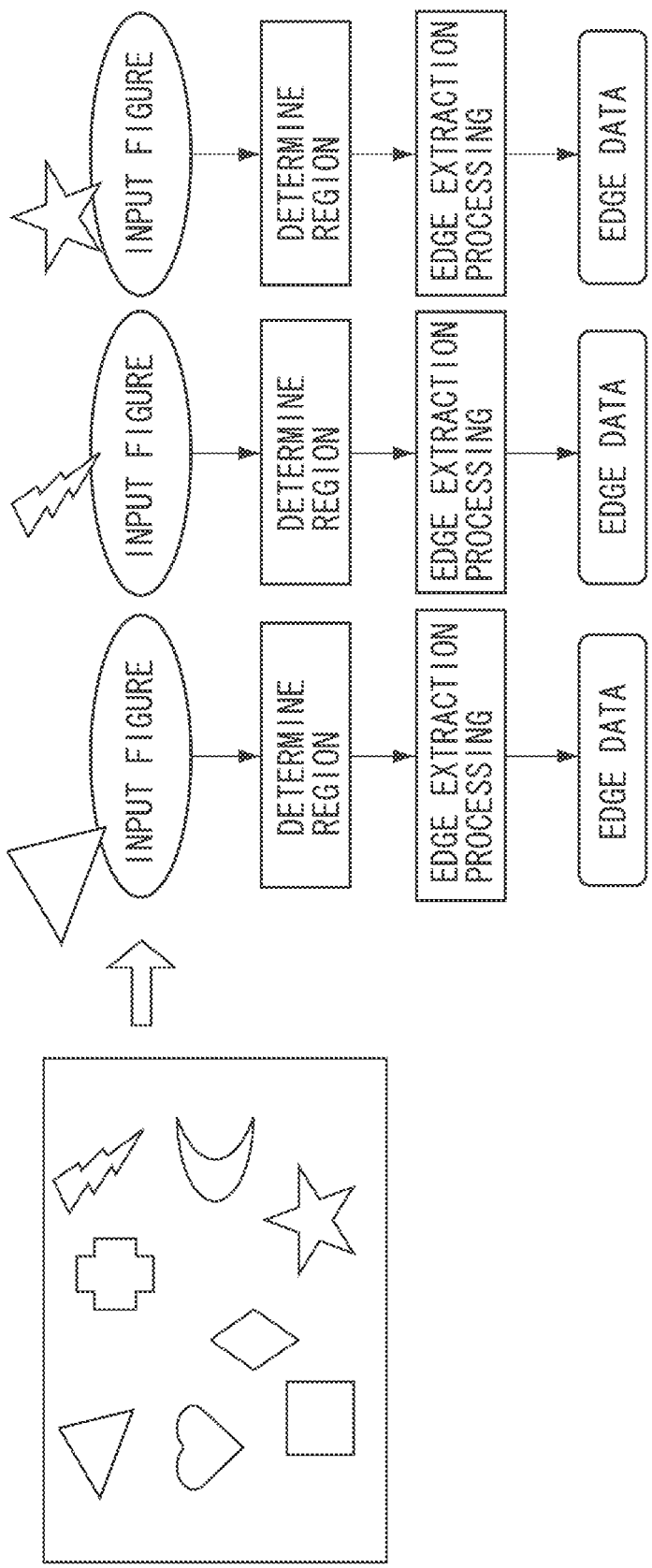
FIG. 4 is a conceptual drawing of figures where edge extraction processing is independently applied to each of the figures.

FIG. 4 is a conceptual drawing of the edge extraction processing independently applied to each figure. The edge extraction processing is performed for each figure on the page. The edge information extracted from each figure is mapped again to the coordinates of the page and merge processing is performed. The processing of each figure can be independently performed since there is no dependence among the processings. In other words, after data of the figures is input, a plurality of threads can be assigned to the edge extraction processing and the data merge processing (data merging) for each figure. The processing of the threads is mapped to each unit (CPU core) that executes the processing. Since each core executes the processing in a time-independent manner, the operations can be parallel performed.

Further, the renderer according to the present exemplary embodiment includes a core management mechanism that determines the assignment of the core based on a result of a data analysis (e.g., PDL-related information). Thus, the renderer executes parallel processing according to the control of the core management mechanism. If many cores can be used on the system, in order to enhance the efficiency of the processing, PDL-related information, which is basic information of each figure, is extracted when PDL data reception processing is performed. Then, the renderer performs mapping of processing such as vectorization to pipeline processing of the subsequent stage so that data processing load can be distributed. Thus, when the number of cores is increased, the performance can be improved in a scalable manner.

Next, a basic configuration of a raster image processor (RIP) system having a parallel processing structure will be described.

Figure 5:
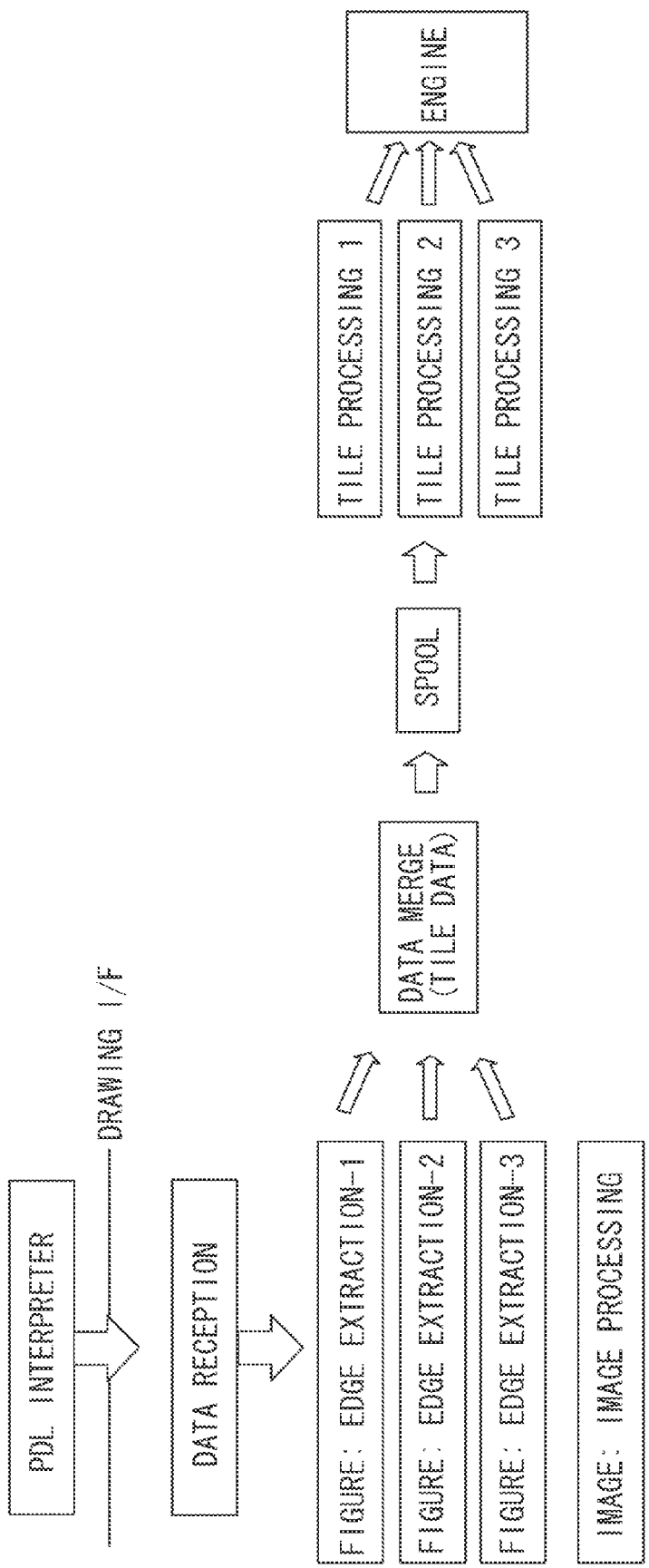
FIG. 5 illustrates an example of a software configuration (system configuration) of the image processing apparatus.

FIG. 5 illustrates an example of a software configuration (system configuration) of the image processing apparatus. As illustrated in FIG. 5, PDL data is transferred to the RIP system side via a drawing interface. On the RIP system side, a "data reception" processing block receives a PDL object such as a figure, a character, or an image. After the data is stored in an internal spooler (not illustrated) as appropriate, the data is transferred to the processing unit in the subsequent stage.

If a PDL object is a figure, the "data reception" transfers the data to edge extraction processing (thread) illustrated in FIG. 5. On the other hand, if a PDL object is an image, the "data reception" transfers the data to image processing (thread). If a plurality of figures exists on a page, the edge extraction processing is assigned to each figure.

Each of the edge data pieces extracted by the edge extraction processing is transferred to data merging processing (thread) of the subsequent stage as appropriate. When the edge data is merged on the page (subjected to overlapping processing), the format of the data is changed to tile data and the tile data is written to a spooler as RIP intermediate data. The RIP intermediate data in the tile format is further transferred to tile processing (thread) of the subsequent stage. Then, pixel rendering processing of each tile is performed by the tile processing (thread). The processing of each tile is executed in a time independent manner.

Figure 6:
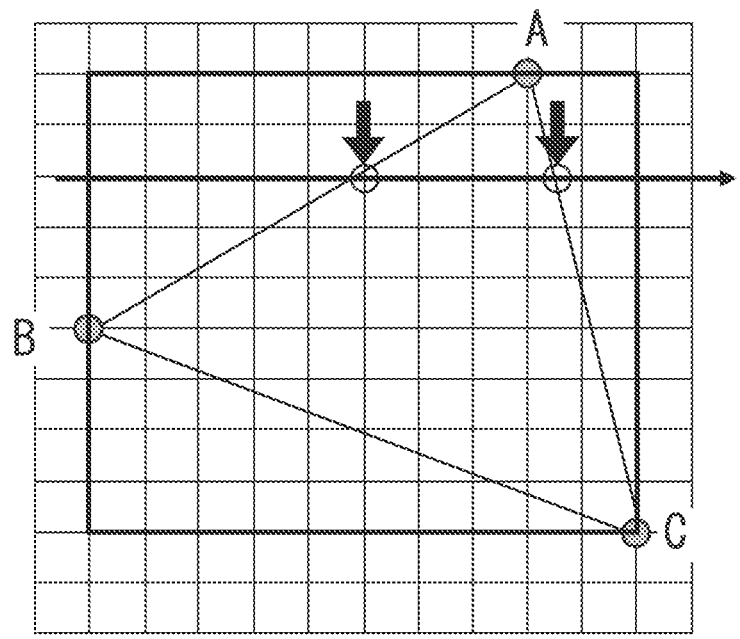
FIG. 6 illustrates the edge extraction processing of a triangle.

FIG. 6 illustrates edge extraction processing of a triangular figure. In FIG. 6, an arrow pointing right in the horizontal direction indicates a scan line. The scanning is performed from top to bottom of a circumscribed rectangle of the triangle. FIG. 6 illustrates a state in which a scanning of a third line is being performed and two edges of a side AB and a side AC are extracted.

Figure 7:
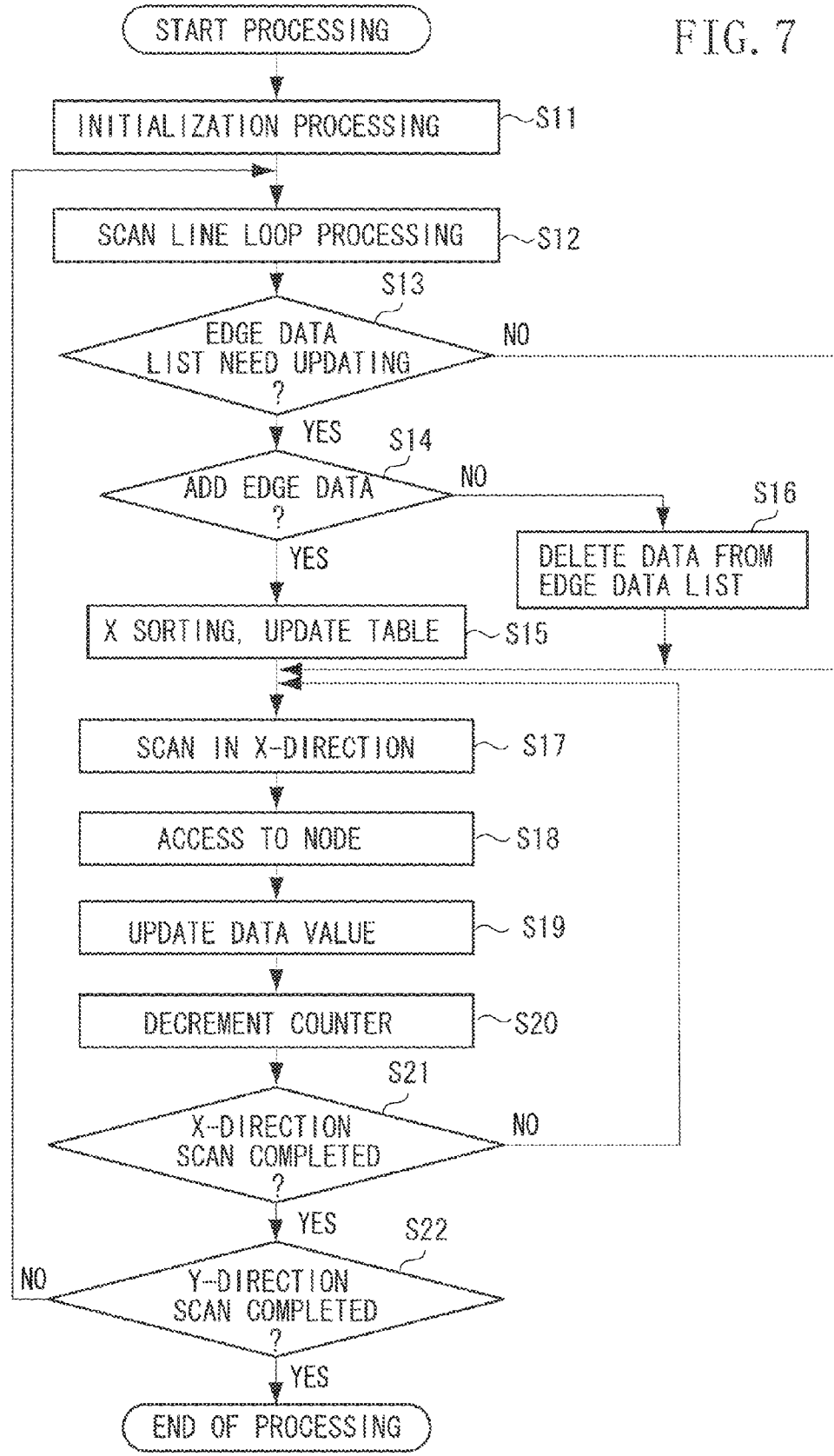
FIG. 7 is a flowchart illustrating an example of scan line processing.

FIG. 7 is a flowchart illustrating an example of the scan line processing.

In step S11, "edge extraction processing" performs initialization processing of figure data which has been input. During this processing, the "edge extraction processing" determines the range of the scanning and sets parameter groups of loop numbers for processing in the subsequent stage.

In step S12, the "edge extraction processing" starts the loop processing of the scan line in the Y direction.

In step S13, the "edge extraction processing" acquires data of the figure on the current scan line (data of the side that forms the outline of the figure) and determines whether edge information of the figure on the scan line (current edge data list) needs to be updated. If the current edge data list does not need to be updated (NO in step S13), the processing proceeds to step S17. If the current edge data list needs to be updated (YES in step S13), the processing proceeds to step S14.

In step S14, the "edge extraction processing" determines whether an edge is to be added to or deleted from the current edge data list. If an edge is to be added (e.g., the scan line goes over the outline of the figure) (YES in step S14), then in step S15, the "edge extraction processing" adds the data so that the data is in an ascending order in the X direction. The added data is referred to as a node. The nodes are connected on the list.

On the other hand, if the edge data is to be deleted (e.g., scan line does not go over the outline of the figure) (NO in step S14), then in step S16, the "edge extraction processing" deletes the corresponding data from the edge data list.

In step S17, the "edge extraction processing" extracts the edge information in the X direction of the current scan line. In step S18, the "edge extraction processing" sequentially accesses each node in the edge data list. The edge information is configured such that data value (DA) of a scan line of a current value (Y value) is updated from information such as a slope of a line segment. In step S19, the data value is updated.

In step S20, the counter is decremented for the X loop. In step S21, the "edge extraction processing" determines whether the X direction loop has been completed.

Steps S17 to S21 are processing of a loop in the X direction. Whereas steps S12 to S22 are processing of a loop in the Y direction. By this double loop, outline information (edge information) of a plane figure can be extracted.

Figure 8:
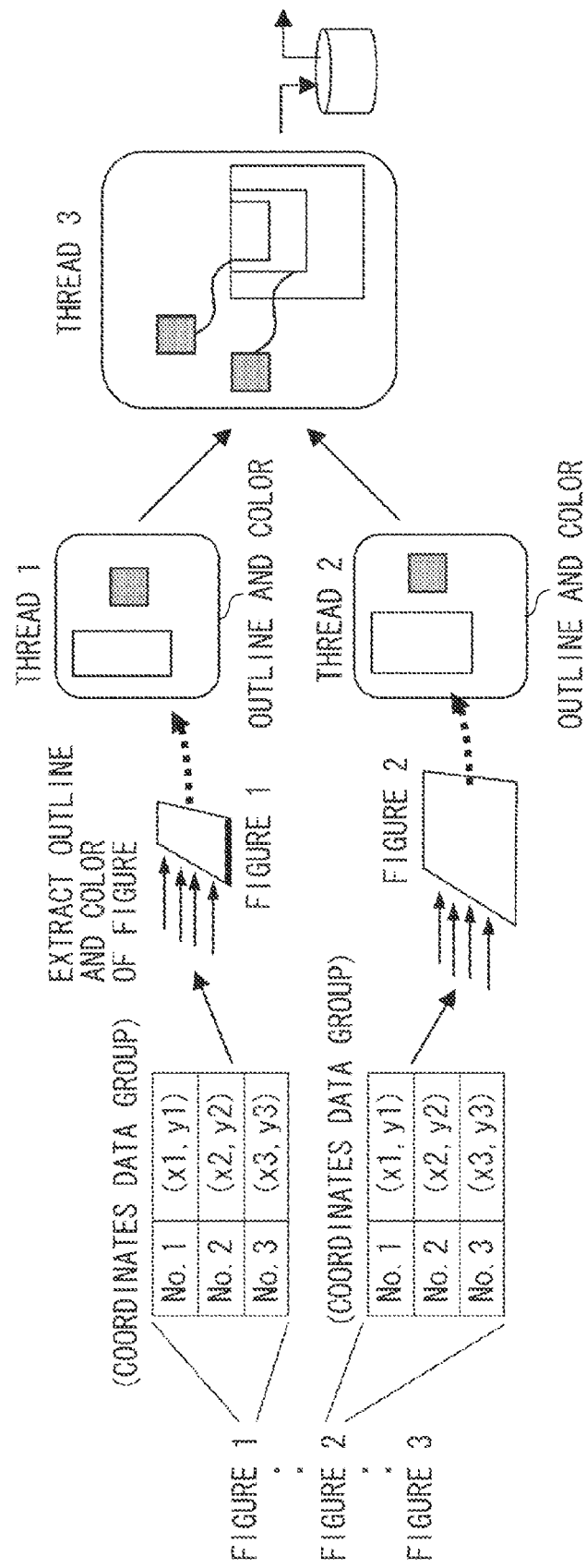
FIG. 8 illustrates data flow of "edge extraction processing" and "data merging" that merges data which has been extracted.

FIG. 8 illustrates flow of data regarding the "edge extraction processing" and processing of "data merging" used for merging the extracted edge data, in the processing of the basic system illustrated in FIG. 5.

Figure 1:
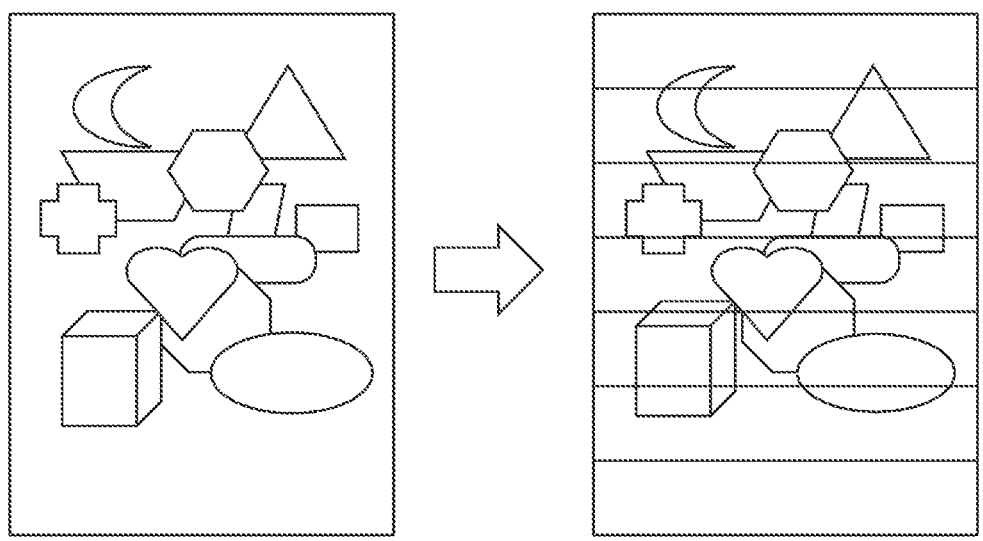
FIG. 1 illustrates an example of a processing result of a conventional renderer.

In FIG. 8, data of each of FIGS. 1 and 2 includes a group including figure type information indicating a type of the figure and coordinates data of the figure as entity. Edge data is extracted from these data pieces by the "edge extraction processing" described above with reference to the processing flow in FIG. 7. Since processing of the FIGS. 1 and 2 is independently performed by different threads, edge data pieces of the two figures are simultaneously extracted. This processing is expressed as threads 1 and 2 in FIG. 8. During this processing, paint information inside the outline of the figure is simultaneously extracted by color information extraction processing (not illustrated).

In the thread 3, merge processing of the edge data and color information extracted in the threads 1 and 2 is performed by "data merging". For example, if the FIG. 2 is painted by a single red color (opaque) and the FIG. 1 is painted by a single blue color (opaque), and further, if the FIG. 1 is arranged over the FIG. 2, the color of the overlapping portion will be blue, which is the color of the top layer. In this state, color information of two colors (i.e., blue and red) is stored. On the other hand, regarding the processing region of the thread 3 (rectangular tile in FIG. 8), merging of edge data of the regions of the FIGS. 1 and 2 is performed. (For example, unnecessary edge data due to overlapping will be deleted.)

According to the processing method of the present exemplary embodiment, the number of color information pieces to be stored regarding regions may be increased depending on the overlapping state. For example, if the FIG. 1 is painted by a single red color (opaque) and the FIG. 2 is painted by a single blue color (transparent), and further, if the FIG. 2 is arranged over the FIG. 1, according to calculation of transparent merge, the color of the overlapping region is calculated. For example, since blue and red merge into purple, according to the processing in the thread 3, color information pieces of red, blue, and purple is stored.

Figure 9:
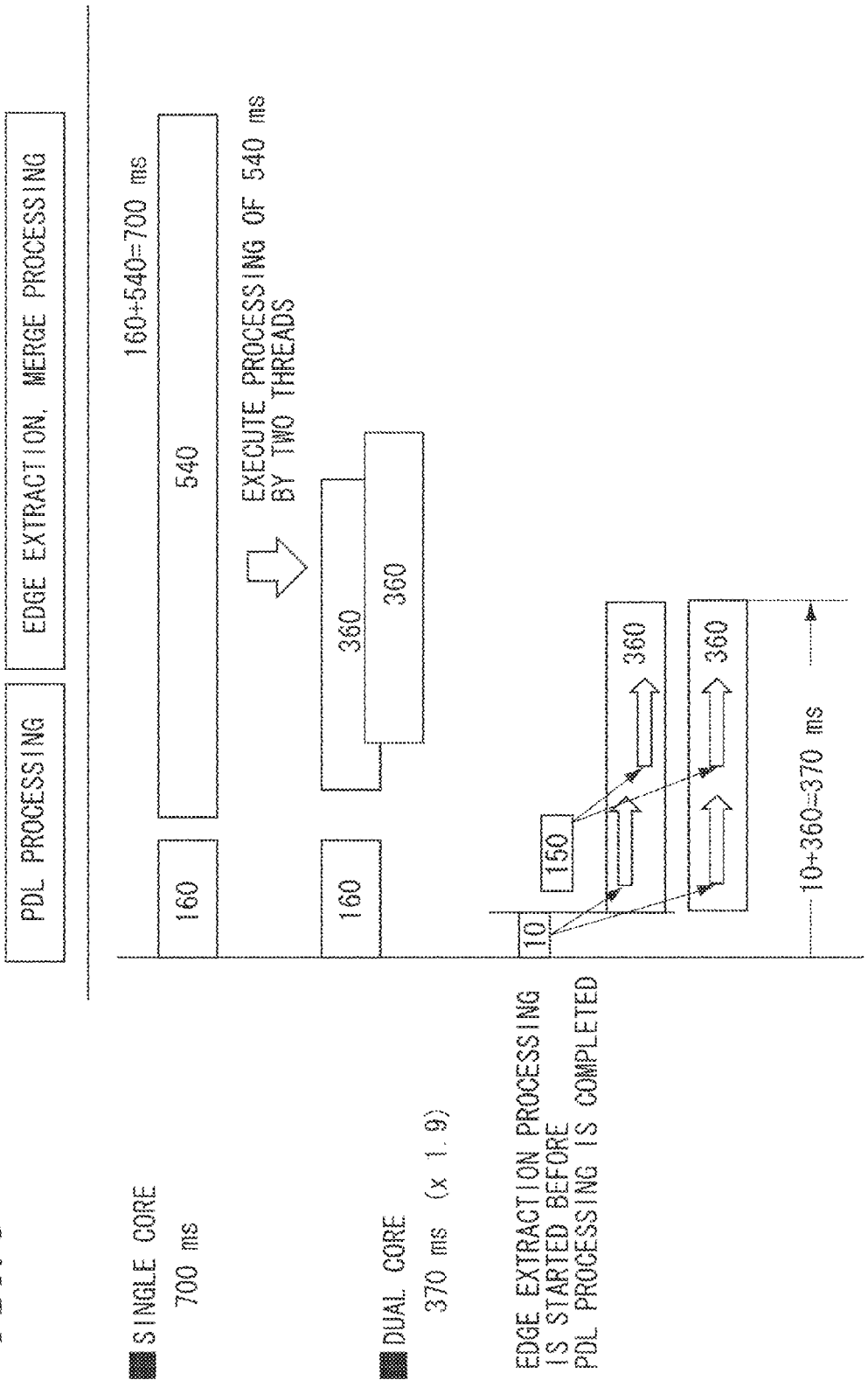
FIG. 9 illustrates how time is reduced by PDL processing and edge extraction processing (including merge processing).

FIG. 9 is a graph illustrates how time is reduced in the PDL processing and the edge extraction processing (including merge processing). If the CPU includes only a single core, even if a plurality of threads is used, each thread is only processed according to time-division processing. Thus, substantially, high-speed processing cannot be achieved. In FIG. 9, the time required for the PDL processing corresponds to the processing time of the "PDL interpreter" and the "data reception" in FIG. 5. Further, the time required for the edge extraction corresponds to time of the "edge extraction processing" and the "the merging processing" in FIG. 5.

According to the graph, if the system uses a single-core CPU, a total of 700 milliseconds is required for processing of one page. In other words, it takes 160 milliseconds to execute the PDL processing and 540 milliseconds to execute the following edge extraction processing.

Further, if the system uses a dual-core CPU, since the PDL processing and the edge extraction processing can be executed independently, the edge extraction processing can be started before the processing of the PDL figures for one page is finished. For example, the edge extraction processing can be immediately started when the processed data is transferred from the PDL processing of the first figure. Further, the edge extraction processing can be started after a plurality of figures is stored for a fixed period of time.

According to the example in FIG. 9, the edge extraction processing is started 10 milliseconds after the start of the PDL processing. As the edge extraction processing proceeds, the PDL processing simultaneously generate the data necessary for the edge extraction processing. In addition, The edge extraction processing is performed by dividing into two processing groups. Since two cores operate at the same time, the total edge extraction processing can be accelerated. When the PDL processing is performed, one core performs the PDL processing and the edge extraction processing in a time-division manner, but the other core performs only the edge extraction processing (the role can be changed between the cores). Thus the total processing time can be reduced.

Figure 10:
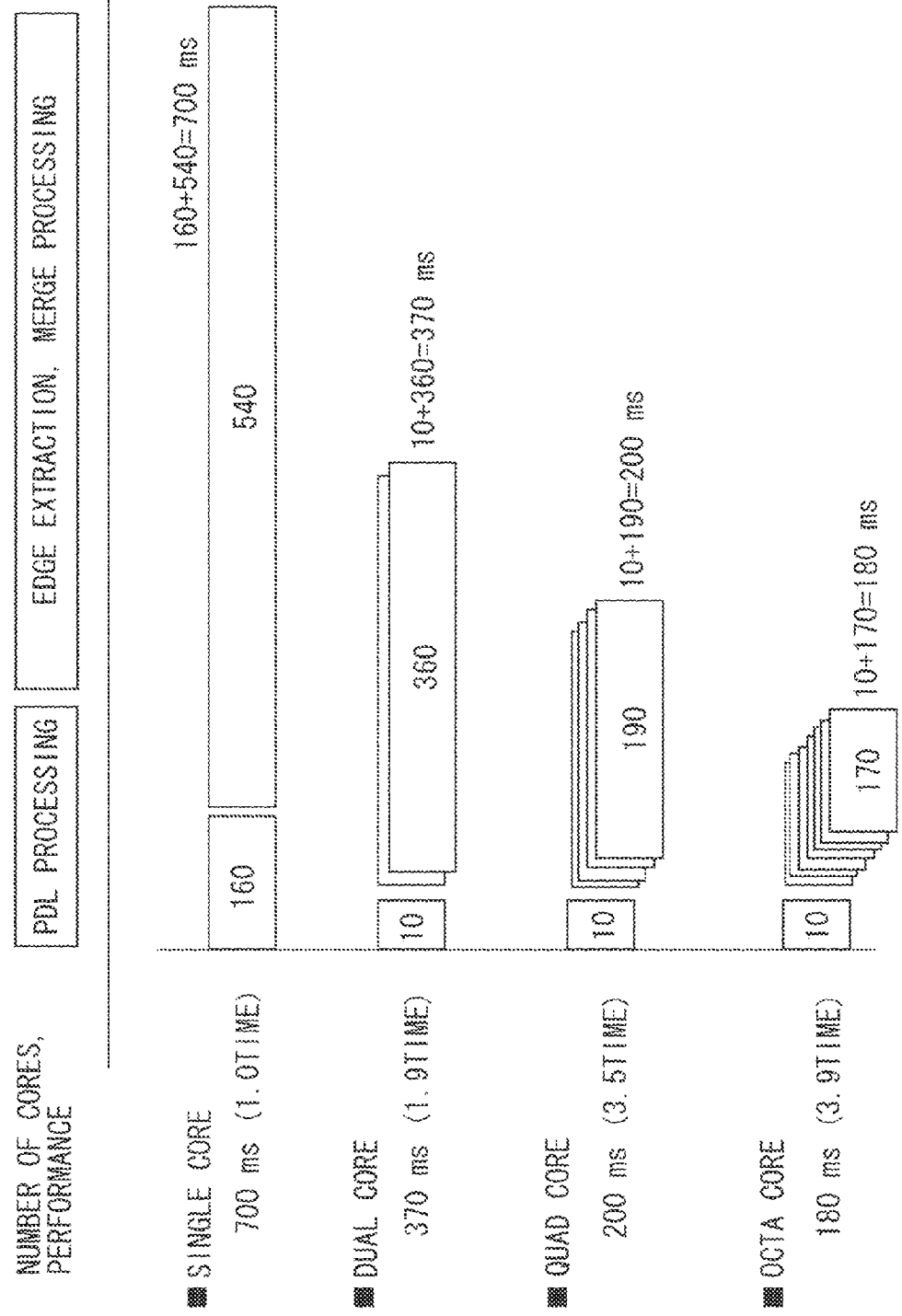
FIG. 10 illustrates changes in performance when the number of cores used in the configuration is increased in a first exemplary embodiment.

FIG. 10 illustrates changes in performance when the number of cores used in the configuration of the first exemplary embodiment is increased. As illustrated in FIG. 10, if processing time of one page by a single-core CPU is 700 milliseconds, the time can be reduced to 370 milliseconds (speeding up of 1.9 times) for a dual-core CPU, 200 milliseconds (speeding up of 3.5 times) for a quad-core CPU, and 180 milliseconds (speeding up of 3.9 times) for an octa-core CPU. Thus, according to the configuration of the first exemplary embodiment, the performance (RIP processing speed) can be improved according to the number of cores.

Considering a case where the number of cores is furthermore increased, the internal processing state when the number of cores is increased has been analyzed.

Figure 11:
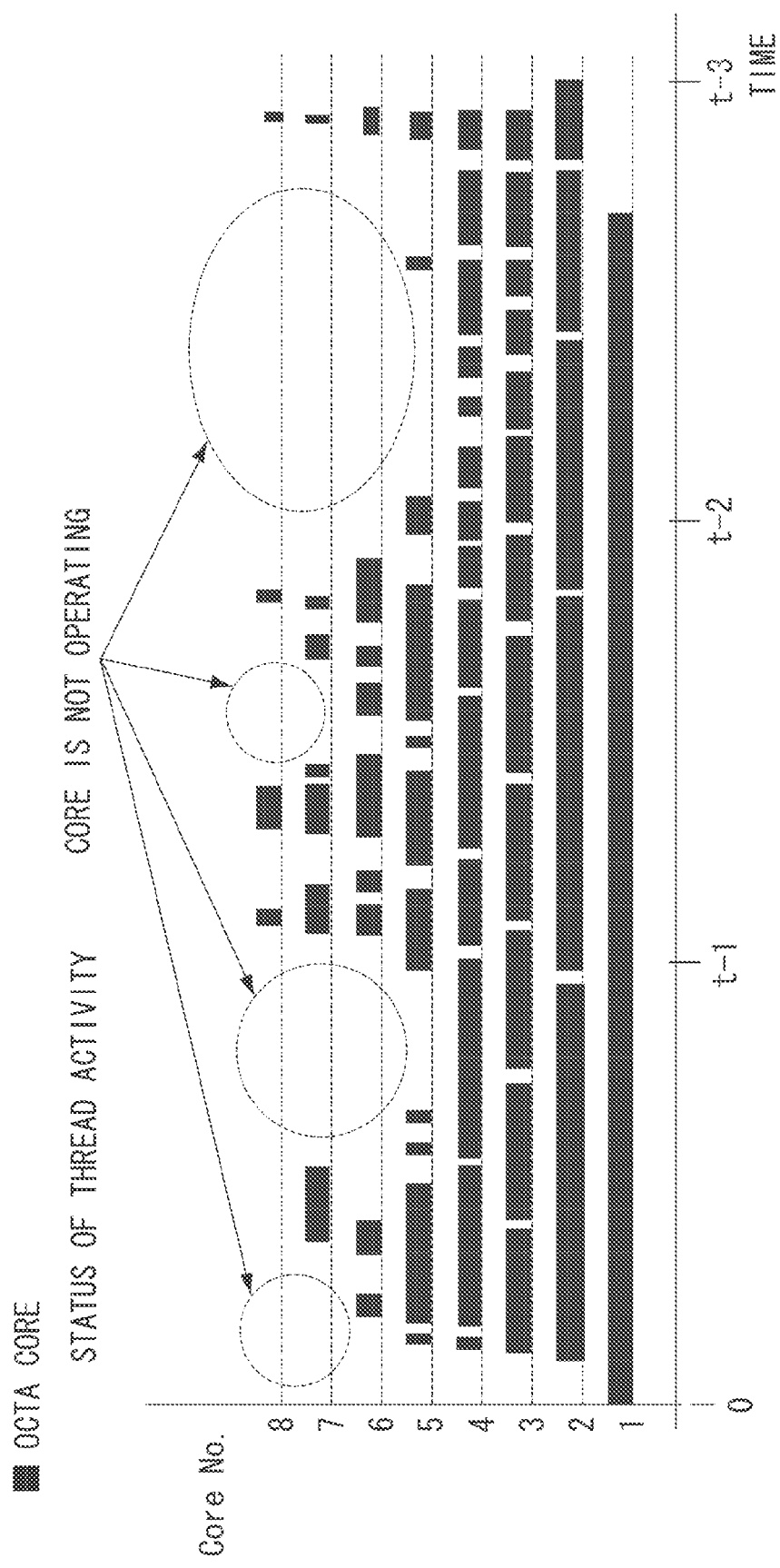
FIG. 11 illustrates an activity state of a program internal thread of an octa-core processor.

FIG. 11 illustrates an example of an activity state of program internal threads of an octa-core CPU. FIG. 11 is a thread activity graph. In FIG. 11, the black-banded portions indicate the time the CPU core is operating the thread and the blank portions indicate the idle time of the core. As can be seen from the circles in FIG. 11, the cores (core numbers 8, 7, and 6) are frequently in the idle state (idle time period). If a quad-core CPU used under the same condition (same data load) is analyzed, such a state is not observed.

Figure 12:
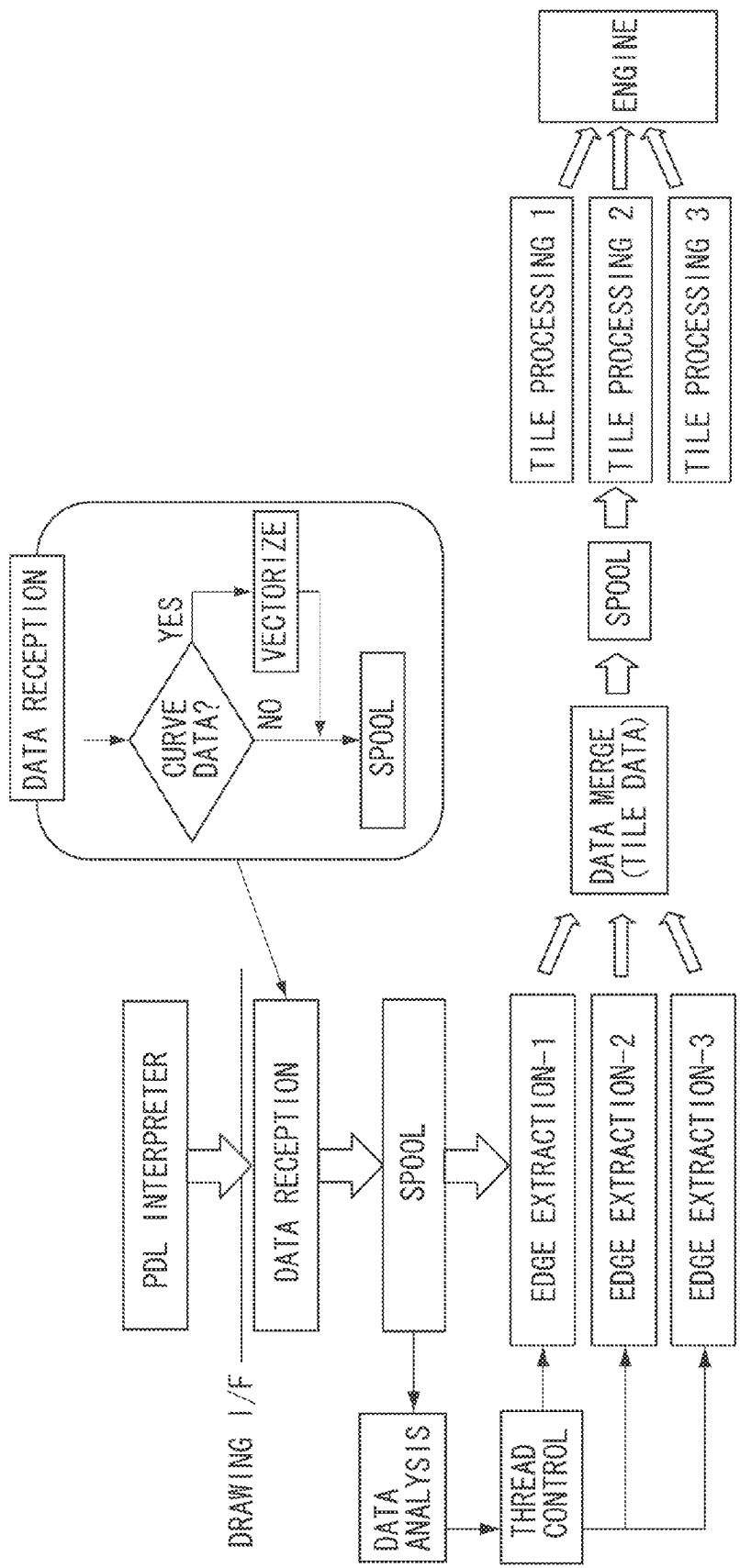
FIG. 12 illustrates occurrence of a bottleneck in the "data reception" processing.

Further, a bottleneck at the processing of "data reception" in FIG. 12 has been found according to the analysis. At the data reception, if the received figure consists only of straight line data, the data of the figure can be received immediately. However, if the received figure includes curve data, straight line processing referred to as vectorization will be performed. If a number of figures with many curves are input, processing speed of processing that can be normally processed at a high speed will be reduced. As a result, data cannot be transferred in time to the edge extraction processing in the subsequent stage. If the edge extraction processing cannot receive data, it cannot start the processing and waits in the idle state until the data is transferred.

Figure 13A:
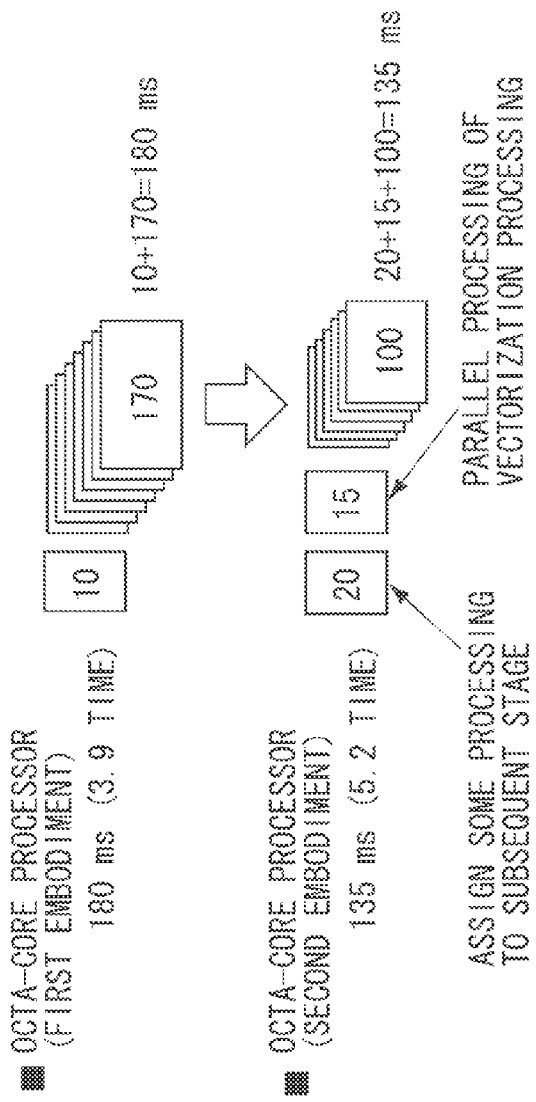
FIGS. 13A and 13B illustrate "data reception" processing processed in multiple stages (a plurality of stages).
Figure 13B:
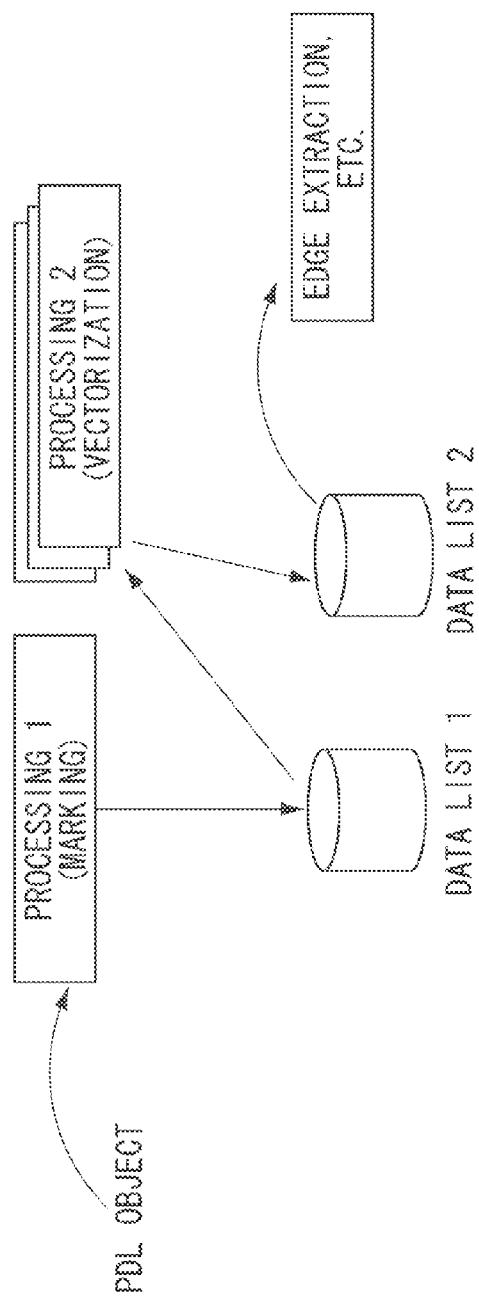

Thus, according to a second exemplary embodiment, processing of "data reception" is divided into processing blocks of multiple stages as illustrated in FIG. 13B. In this manner, overall performance can be furthermore improved. In FIG. 13B, a PDL object is transferred to the data reception processing via the drawing interface. The data reception processing first determines whether vectorization is necessary. Then, only when the vectorization is necessary, the figure is marked, and the data is spooled in a data list 1. The data list 1 is an example of a first data storage unit.

According to the second exemplary embodiment, as illustrated in FIG. 13B, the vectorization processing itself is executed at time different from the time "processing 1" is executed. In other words, the vectorization processing is executed at independent time by a task of a different thread in the subsequent stage. In the vectorization processing in the subsequent stage, data that needs vectorization is appropriately picked up from the data pieces in the data list 1, and the vectorization is performed. (This operation can be executed in a plurality of threads as illustrated in FIG. 13B.) The vectorized data is stored in a data list 2 and transferred to the edge extraction processing in the subsequent stage. In other words, the figure which is not marked and stored in the data list 1 as well as the figure stored in the data list 2 are transferred to the edge extraction processing in the subsequent stage. The data list 2 is an example of a second data storage unit.

As illustrated in FIG. 13A, even if the number of CPU cores is increased to eight, data pieces are continuously supplied to the edge extraction processing. As a result, parallel processing can be constantly performed, and the overall performance can be improved.

As described with reference to FIG. 13B, the processing performance can be improved if a multi-stage processing block is applied to "data reception" and an octa-core CPU is used. Next, a case where the multi-stage processing block is applied to a quad-core CPU will be described.

As illustrated in FIG. 13A, when data is processed by an octa-core CPU, 35 milliseconds (20 milliseconds+15 milliseconds) is used for overhead of data reception. If this is applied to a quad-core CPU, since four cores are in full operation for the edge extraction processing, the speed of the parallel processing cannot be improved. This means that even if the efficiency of the data supplying side is improved, improved performance of the system cannot be expected. Thus, when a quad-core CPU is used, a processing system including a multi-stage configuration such as the one illustrated in FIG. 13B is not desirable. Thus, according to the second exemplary embodiment, the processing algorithm is changed according to whether the number of cores is four or eight.

Figure 14:
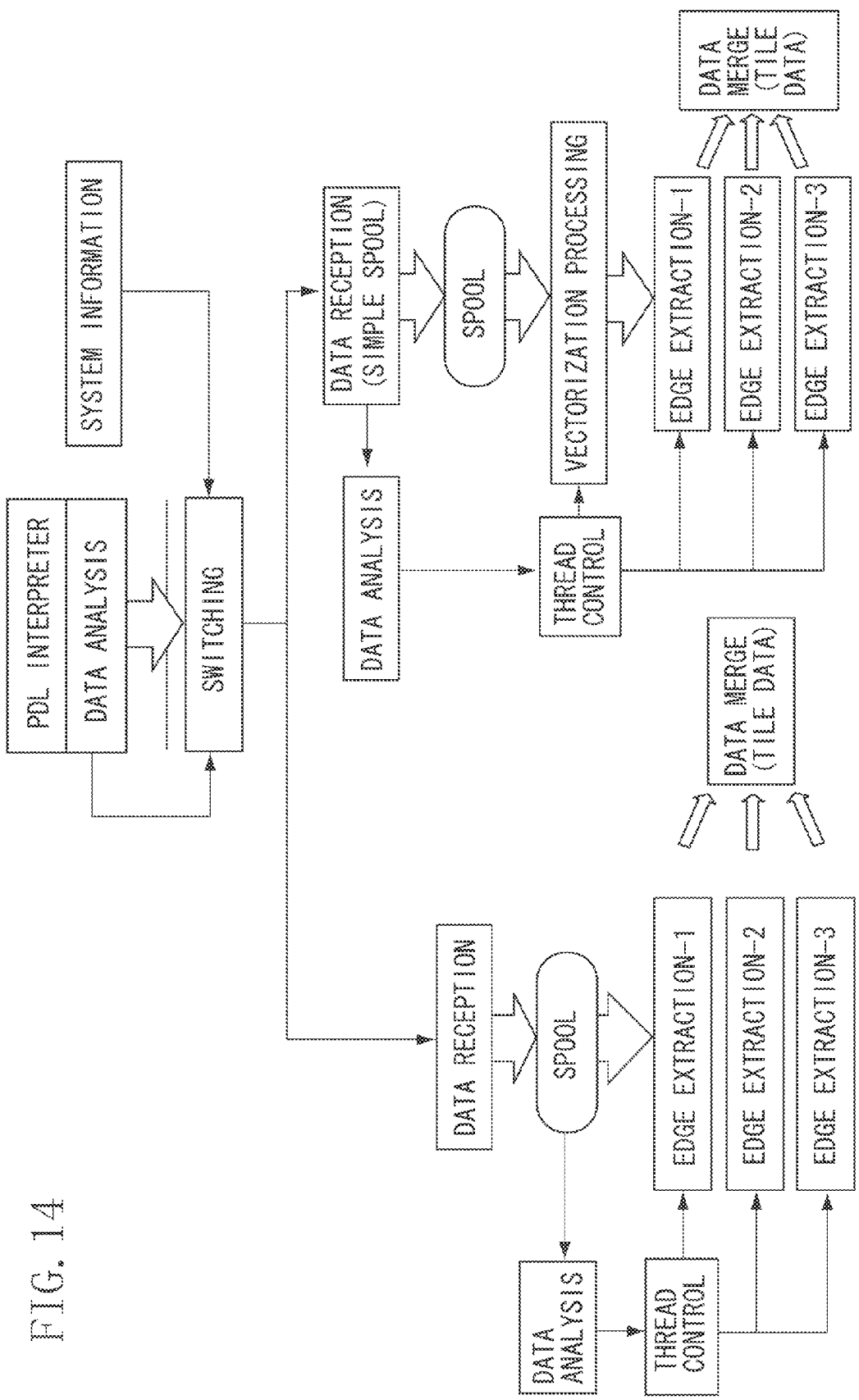
FIG. 14 illustrates an example of changing processing to be selected according to information of a number of available cores notified from the system.

FIG. 14 illustrates an example where different processing is selected according to information of a number of available cores transferred from the system side. More specifically, if the number of cores is one to four, the configuration of the first exemplary embodiment on the left block in the drawing is used. If the number of cores is eight or more, the configuration on the right block in the drawing is used and the data reception processing is performed according to the multi-stage processing algorithm illustrated in FIG. 13B. The number of cores four is an example of the predetermined core number.

Figure 15:
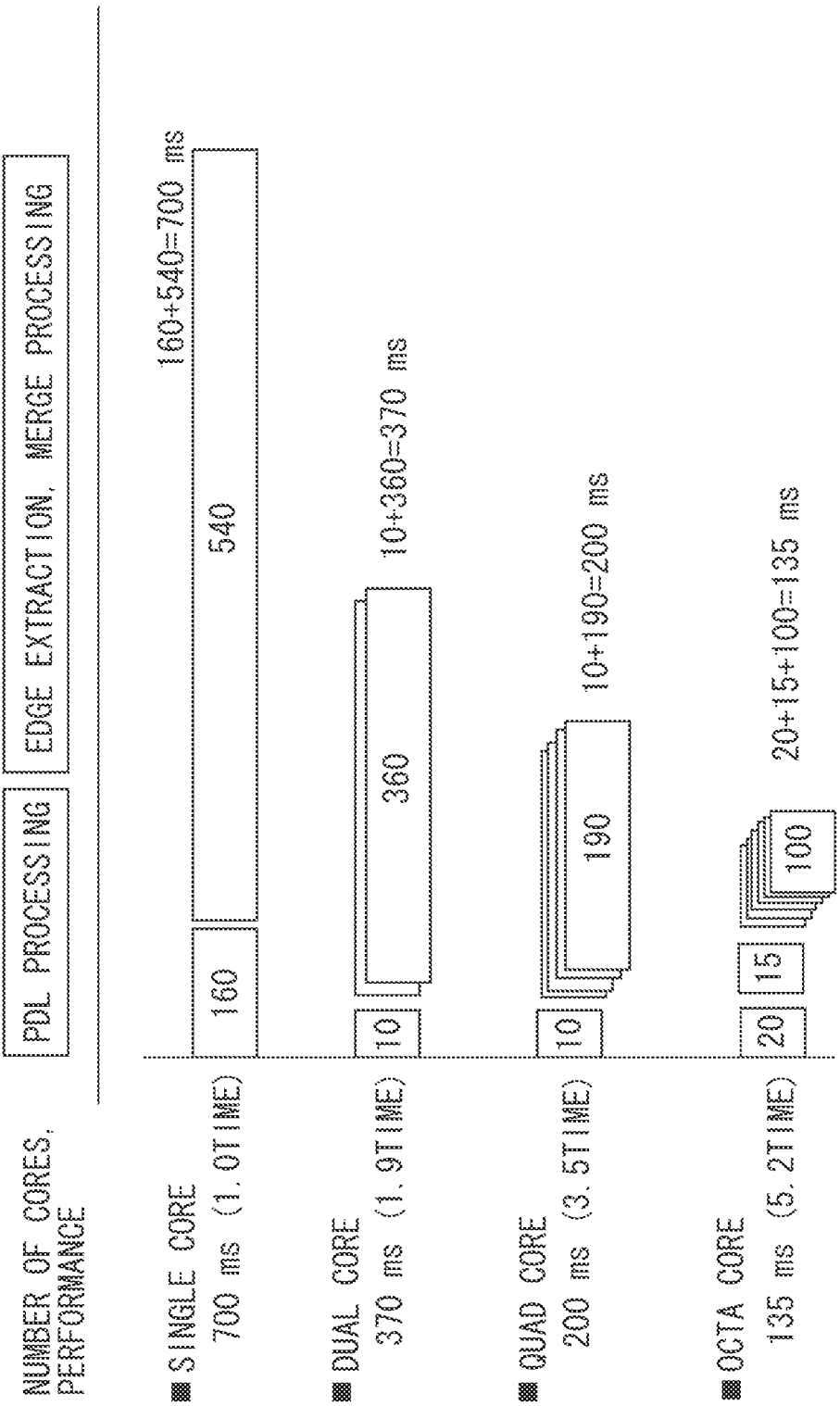
FIG. 15 is a graph illustrating changes in performance with respect to the number of cores according to a second exemplary embodiment of the present invention.

FIG. 15 illustrates changes in performance when the number of cores used in the configuration of the second exemplary embodiment is changed. As illustrated in FIG. 15, if processing time of one page by a single-core CPU is 700 milliseconds, the time can be reduced to 370 milliseconds (speeding up of 1.9 times) for a dual-core CPU, 200 milliseconds (speeding up of 3.5 times) for a quad-core CPU, and 135 milliseconds (speeding up of 5.2 times) for an octa-core CPU. Thus, according to the configuration of the second exemplary embodiment, the performance (RIP processing speed) can be furthermore improved according to the number of cores.

According to the second exemplary embodiment, although processors up to the octa-core CPU have been described, the number of cores of the CPU is not limited. Further, although the data reception processing illustrated in FIG. 5 is described as the processing of a processing unit having the multi-stage configuration regarding an octa-core CPU, the processing unit can be applied to different processing so long as a similar effect can be obtained. In other words, the processing unit can be applied without dependence on any specific processing.

If a multi-core CPU with cores more than eight is used, the time required for the edge extraction can be furthermore reduced. In that case, although new processing flow that allows data reception processing of higher speed can be introduced, processing can be started after data is fully accumulated on the supply side. If the number of cores is increased, the balance of input data and output data of the processing unit that processes data needs to be adjusted. The data balance can be adjusted based on experiments and can also be adjusted based on a theoretical model or on a prediction. When the number of cores is increased, the processing of each block itself can be realized by a different method.

Figure 16:
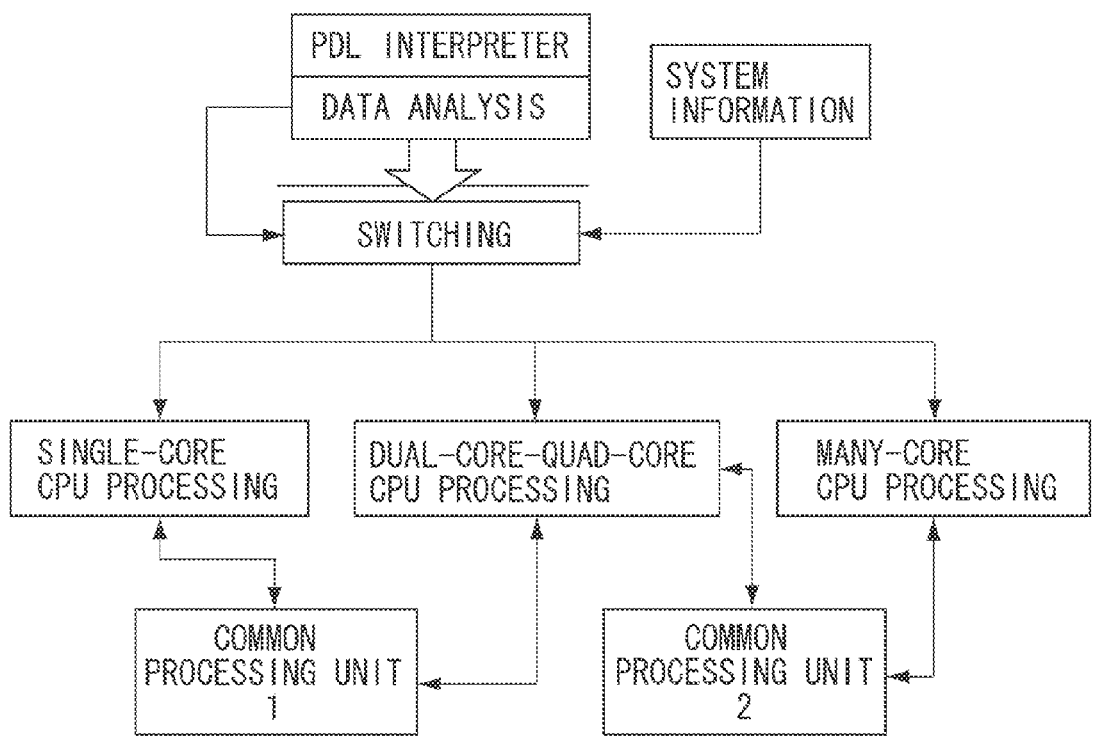
FIG. 16 illustrates an example of a system configuration when the processing flow is changed according to the number of cores.

FIG. 16 illustrates an example of a system configuration whose processing flow is changed according to the number of cores. Regarding the processing flow which changes the processing according to the number of cores, a function block which is commonly used by each processing flow is set in modules to minimize the program size. Further, as another conceivable case, if data of many pages, whose processing load are light, is input in a quad-core CPU, the CPU core itself will be idle for a considerable amount of time. In such a state, many processing-completed pages are accumulated in the spooler, and accelerated processing of the page is not necessary in order to keep the engine output speed. Thus, an arbitration function (a system that can adjust idle time according to the core number) can be provided in advance.

According to the above-described exemplary embodiments, regardless of the arrangement of the figures, a core can be equally assigned to each of the figures. Accordingly, efficiency of the processing can be improved (reduction of useless data transfer and core wait time). As a result, even if a page of high processing load that includes many graphics is input, the rendering speed can be effectively improved.

The above-described configuration can be used for a printer apparatus, a display device, and an image output device.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A image processing method executed by an image processing system including a plurality of CPU cores and a storage configured to store a plurality of program codes, each program code being used alone for executing a plurality of preceding type processes and executing, in parallel, a plurality of following type processes each of which is executed using a different one of results of the preceding type processes, the method comprising:

selecting, from among the stored plurality of program codes, one program code according to a number of available cores of the CPU cores; and controlling, based on the selected program code, at least one core among the available cores to execute the plurality of preceding type processes, and a first core and a second core among the available cores except the at least one core to execute each of a following type process which is executed using a result of a first preceding type process and a following type process which is executed using a result of a second preceding type process, in parallel, wherein a first program code which the selecting selects from among the plurality of program codes according to the number of the available cores being a first number larger than a second number causes, in the controlling, a larger number of cores among the available cores to execute the plurality of the preceding type processes than a second program code which the selecting selects from among the plurality of program codes according to the number of the available cores being the second number causes.

2. The method according to claim 1, wherein the storage is configured to store a common program code, and each of the stored plurality of program codes is executed with the common program code stored in the storage.

3. The method according to claim 1, wherein each of the stored plurality of program codes is executed for a print job.

4. The method according to claim 3, wherein the print job is a job for printing based on data described in a Page Description Language.

5. The method according to claim 1, wherein the preceding type process is an analysis process for receiving and analyzing a figure, wherein the following type process is an edge extraction process for extracting an intersection of the figure analyzed by the preceding type process and a scan line as an edge, wherein each of the stored plurality of program codes includes both of a code for the analysis process and a code for the edge extraction process, and wherein, in the controlling, each of the first and second cores is controlled to execute in parallel, based on the code for the edge extraction process, a different edge extraction process.

6. The method according to claim 1, wherein each of the plurality of following type processes which is executed using a different one of the results of the preceding type processes is executable by either the first core or the second core.

7. An image processing system comprising:

a plurality of CPU cores;

a storage configured to store a plurality of program codes, each program code being used alone for executing a plurality of preceding type processes and executing, in parallel, a plurality of following type processes each of which is executed using a different one of results of the preceding type processes;

a selection unit configured to select, from among the stored plurality of program codes, one program code according to a number of available cores of the system; and a control unit configured to control, based on the selected program code, at least one core among the available cores to execute the plurality of preceding type processes, and a first core and a second core among the available cores except the at least one core to execute each of a following type process which is executed using a result of a first preceding type process and a following type process which is executed using a result of a second preceding type process, in parallel, wherein a first program code which the selecting selects from among the plurality of program codes according to the number of the available cores being a first number larger than a second number causes by the control unit a larger number of cores among the available cores to execute the plurality of the preceding type processes than a second program code which the selecting selects from among the plurality of program codes according to the number of the available cores being the second number causes.

8. The image processing system according to claim 7, wherein the storage is configured to store a common program code, and each of the stored plurality of program codes is executed with the common program code stored in the storage.

9. The image processing system according to claim 7, wherein each of the stored plurality of program codes is executed for a print job.

10. The image processing system according to claim 9, wherein the print job is a job for printing based on data described in a Page Description Language.

11. The image processing system according to claim 7, wherein the preceding type process is an analysis process for receiving and analyzing a figure, wherein the following type process is an edge extraction process for extracting an intersection of the figure analyzed by the preceding type process and a scan line as an edge, wherein each of the stored plurality of program codes includes both of a code for the analysis process and a code for the edge extraction process, and wherein the control unit controls each of the first and second cores to execute in parallel, based on the code for the edge extraction process, a different edge extraction process.

12. The image processing system according to claim 7, wherein each of the plurality of following type processes which is executed using a different one of the results of the preceding type processes is executable by either the first core or the second core.

13. A non-transitory computer readable medium storing a control program code for controlling an image processing system, the system including a plurality of CPU cores and a storage configured to store a plurality of program codes, each program code being used alone for executing a plurality of preceding type processes and executing, in parallel, a plurality of following type processes each of which is executed using a different one of results of the preceding type processes, the control program code comprising:

instructions of selecting, from among the stored plurality of program codes, one program code according to a number of available cores of the system; and instructions of controlling, based on the selected program code, at least one core among the available cores to execute the plurality of preceding type processes, and a first core and a second core among the available cores except the at least one core to execute each of a following type process which is executed using a result of a first preceding type process and a following type process which is executed using a result of a second preceding type process, in parallel, wherein a first program code which the selecting selects from among the plurality of program codes according to the number of the available cores being a first number larger than a second number causes a larger number of cores among the available cores to execute the plurality of the preceding type processes than a second program code which the selecting selects from among the plurality of program codes according to the number of the available cores being the second number causes.

14. The non-transitory computer readable medium according to claim 13, wherein the storage is configured to store a common program code, and each of the stored plurality of program codes is executed with the common program code stored in the storage.

15. The non-transitory computer readable medium according to claim 13, wherein each of the stored plurality of program codes is executed for a print job.

16. The non-transitory computer readable medium according to claim 15, wherein the print job is a job for printing based on data described in a Page Description Language.

17. The non-transitory computer readable medium according to claim 13,
wherein the preceding type process is an analysis process for receiving and analyzing a figure,
wherein the following type process is an edge extraction process for extracting an intersection of the figure analyzed by the preceding type process and a scan line as an edge,
wherein each of the stored plurality of program codes includes both of a code for the analysis process and a code for the edge extraction process, and
wherein, by the instructions of the controlling, each of the first and second cores is controlled to execute in parallel, based on the code for the edge extraction process, a different edge extraction process.

18. The non-transitory computer readable medium according to claim 13, wherein each of the plurality of following type processes which is executed using a different one of the results of the preceding type processes is executable by either the first core or the second core.

* * * * *